(12) United States Patent
Warner et al.

(10) Patent No.: US 12,328,539 B2
(45) Date of Patent: *Jun. 10, 2025

(54) RESOURCE TARGETED SCHEDULING FOR A PON NETWORK

(71) Applicant: ARRIS Enterprises LLC, Horsham, PA (US)

(72) Inventors: Shawn W. Warner, Pepperell, MA (US); Brian K. Gilbride, Braintree, MA (US); Tarkesh R. Mahajan, Westford, MA (US); Jonathan R. Sawin, Tyngsboro, MA (US)

(73) Assignee: ARRIS Enterprises LLC, Horsham, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/600,511

(22) Filed: Mar. 8, 2024

(65) Prior Publication Data

US 2024/0214715 A1 Jun. 27, 2024

Related U.S. Application Data

(63) Continuation of application No. 18/199,841, filed on May 19, 2023, now Pat. No. 11,956,576.

(60) Provisional application No. 63/396,167, filed on Aug. 8, 2022.

(51) Int. Cl.
*H04Q 11/00* (2006.01)

(52) U.S. Cl.
CPC . *H04Q 11/0067* (2013.01); *H04Q 2011/0015* (2013.01); *H04Q 2011/005* (2013.01); *H04Q 2011/0064* (2013.01)

(58) Field of Classification Search
CPC ....... H04Q 11/0067; H04Q 2011/0015; H04Q 2011/005; H04Q 2011/0064; H04Q 11/00; H04Q 2011/0079; H04Q 2011/0086; H04B 10/27; H04B 10/272
See application file for complete search history.

(56) References Cited

U.S. PATENT DOCUMENTS

| 8,189,471 | B2* | 5/2012 | Wu | H04L 12/2861 398/67 |
|---|---|---|---|---|
| 2008/0144622 | A1* | 6/2008 | Platnic | H04L 63/0428 370/390 |
| 2016/0286290 | A1* | 9/2016 | Zheng | H04B 10/272 |
| 2022/0217457 | A1 | 7/2022 | Wang | |

FOREIGN PATENT DOCUMENTS

| EP | 4087270 A1 | 11/2022 | |
|---|---|---|---|
| KR | 100825754 B1 | 4/2008 | |
| WO | WO-2021136092 A1 * | 7/2021 | ......... H04Q 11/0062 |

OTHER PUBLICATIONS

International Search Report and Written Opinion Re: Application No. PCT/US23/23001, dated Sep. 5, 2023.
Carey Tim et al: "TR-451 vOMCI Specification", Jun. 1, 2022, pp. 1-113, XP093005109, Retrieved from the Internet: URL: https://www.broadband-forum.org/technical/download/TR-451.pdf [retrieved on Dec. 5, 2022] Part 5.8.

* cited by examiner

*Primary Examiner* — Hibret A Woldekidan
(74) *Attorney, Agent, or Firm* — Chernoff, Vilhauer, McClung & Stenzel, LLP

(57) ABSTRACT

A system for resource targeted scheduling for a PON network.

18 Claims, 7 Drawing Sheets

RESOURCE TARGETED SCHEDULING FOR A PON NETWORK

CROSS REFERENCE TO RELATED APPLICATIONS

This application is a continuation of U.S. patent application Ser. No. 18/199,841, filed May 19, 2023, which claims the benefit of U.S. Provisional Patent Application Ser. No. 63/396,167 filed Aug. 8, 2022.

BACKGROUND

The subject matter of this application relates resource targeted scheduling for a PON network.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibers and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable.

Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
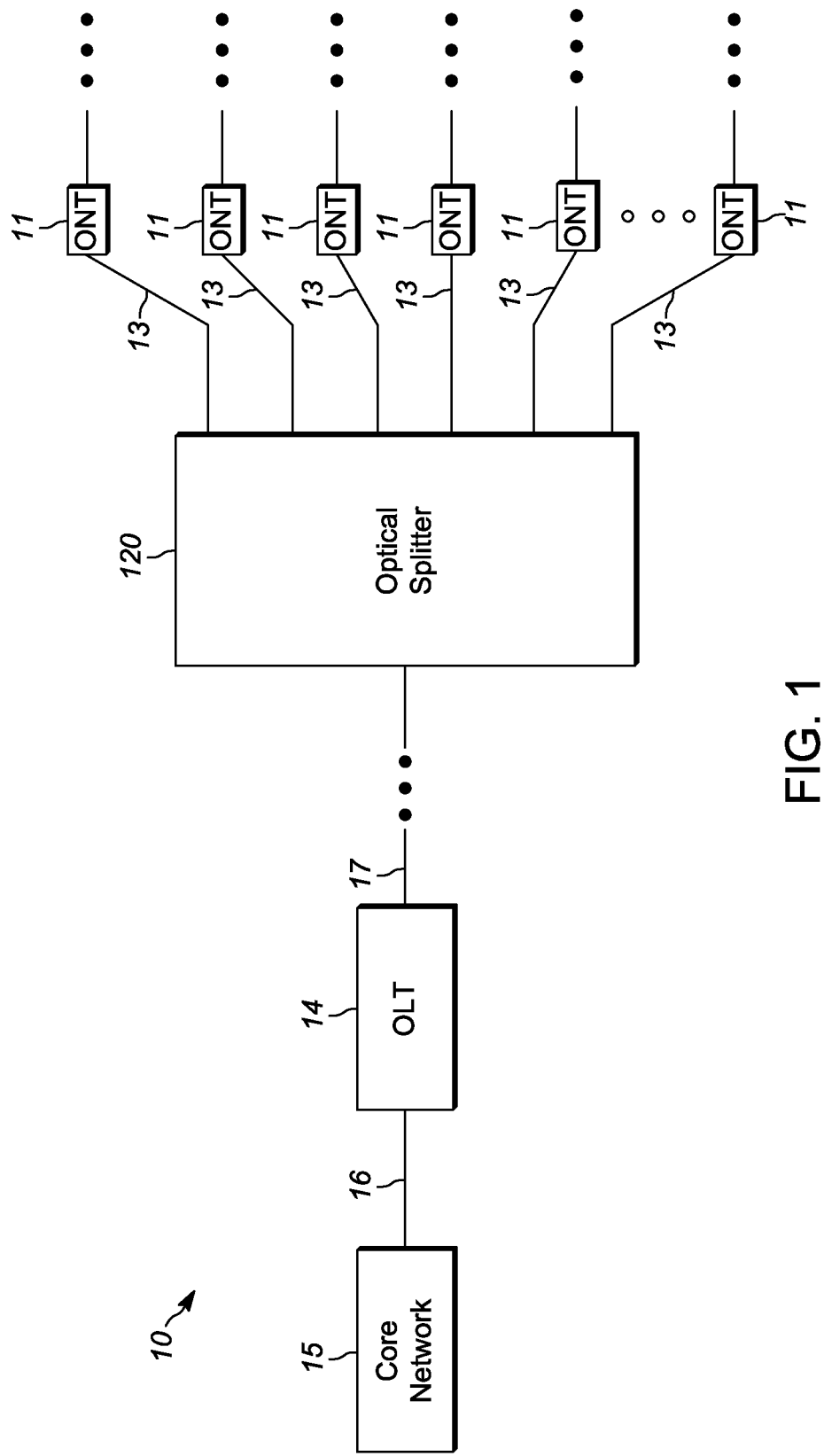
FIG. 1 illustrates a network that includes a passive optical network.
Figure 2:
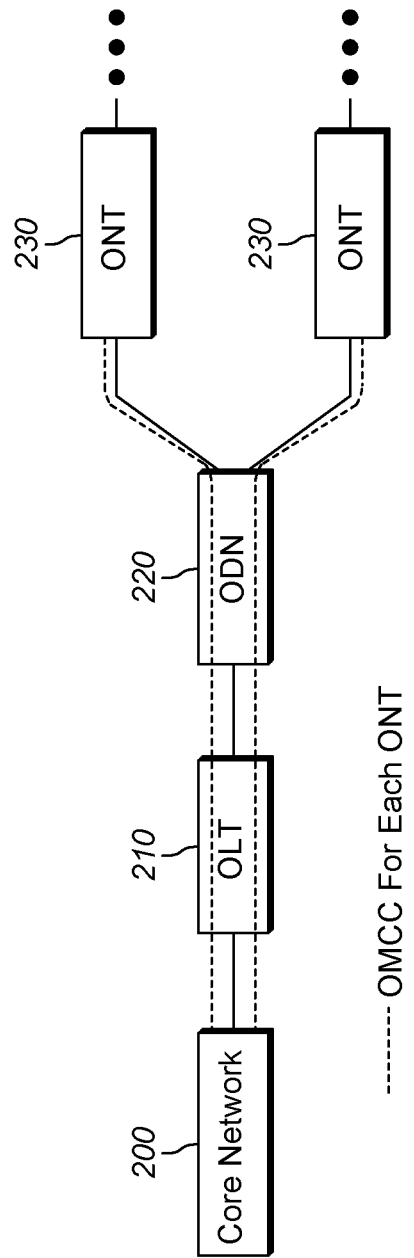
FIG. 2 illustrates OMCC messages provided to and from ONTs in a passive optical network.

Referring to FIG. 2, the core network and/or the optical line terminals provides management and control functionality over the ONT by using an optical network unit management and control interface (OMCI). The core network 200 and the OLT 210 with which it provides data to and receives data from, transmits data and receives data using a PON protocol over an optical distribution network (e.g., optical splitters, etc.) 220. The OLT 210 passes data through the optical distribution network (ODN) 220 to the ONTs 230, and receives data through the optical distribution network (ODN) 220 from the ONTs 230. The OMCI messages between the ONT 210 and the ONUs 230 for management and control are likewise provided between the OLT 210 and the ONTs 230 through the ODN 22. The ONTs 230 provides access network line termination, a user network interface line termination for subscriber devices, and service multiplexing and de-multiplexing for subscriber devices.

The configuration management provides functions to identify the ONTs capabilities and to exercise control over the ONTs. The areas of management for the ONTs include configuration of, (1) equipment, (2) passive optical network and reach extender protection, (3) the user network interfaces, (4) Gigabit-capable passive optical network Encapsulation Method port network contention termination points; (5) interworking termination points; (6) operations, administration, and maintenance flows, (7) physical ports, (8) Gigabit-capable passive optical network Encapsulation Method adaptation layer profiles, (9) service profiles, (10) traffic descriptors, and (11) asynchronous transfer mode adaptation layer profiles. As modelled by the OMCI, the ONT detects and reports equipment, software, and interface failures and declares the corresponding alarms. The ONTs may be considered as managed entities by the exchange of information between the OLT and the ONT, based upon the OMCI messages for optical access networks.

The G.988 standard describes managed entities of a protocol-independent management information base (MIB) that models the exchange of information between OLT and ONT in a PON-based access network that are subject to a standard, such as for example, G.988. See, G.988: ONU management and control interface (OMCI) specification, (11/17); G.988 (2017) Amendment 1 (11/18); G.988 ((2017) Amendment 2 (08/19); G.988 (2017) Amendment 3 (03/2); and G.988 (2017) Amendment 4 (09/21), each of which is incorporated by reference herein in its entirety. G.988 also addresses the ONT management and control channel (OMCC) setup, protocol, and message formats.

Figure 3:
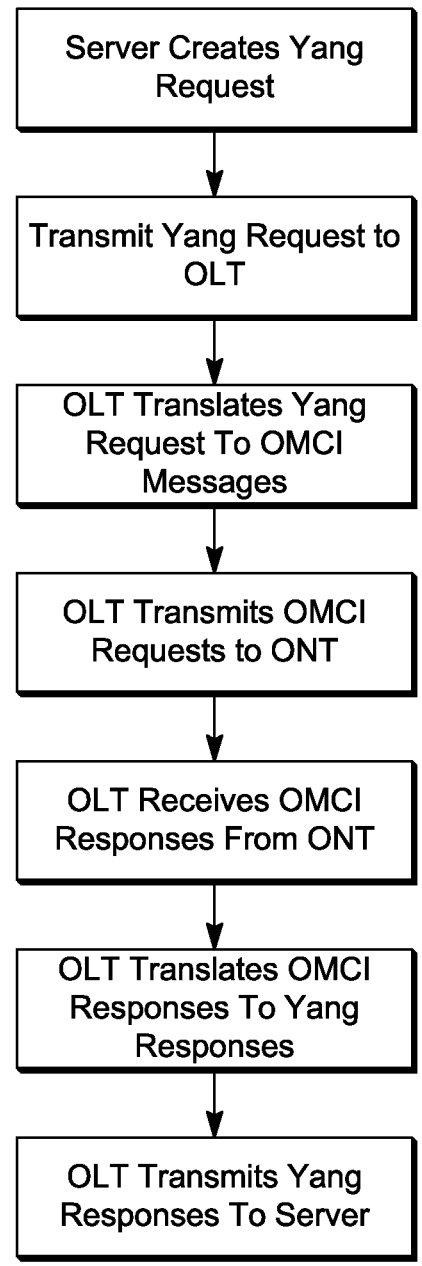
FIG. 3 illustrates an exemplary process flow for OMCI messages to manage ONTs in a passive optical network.

Referring to FIG. 3, one technique to provide an OMCI message to the ONT is for a server at the core network (i.e., any server within the network), to create a virtual OMCI set of microservices. The management data maintained by the system is typically defined in terms of YANG data models that comprise modules and submodules that define configuration and state data, notifications, and remote procedure calls for. A YANG module defines a data model through its data, and the hierarchical organization of and constraints on that data. Each module is uniquely identified by a namespace URI. A module defines a single data model. However, a module can reference definitions in other modules and submodules by using the import statement to import external modules or the include statement to include one or more submodules. Additionally, a module can augment another data model by using the augment statement to define the placement of the new nodes in the data model hierarchy and a when statement to define the conditions under which the new nodes are valid. The core network provides the YANG requests to the OLT which then translates the YANG requests and responses and notifications to and from a vOLTMF (vOLT Management Function) into the OMCI messages, and the OLT transmits and receives the OMCI message requests and responses and notifications to and from the ONT.

Figure 4:
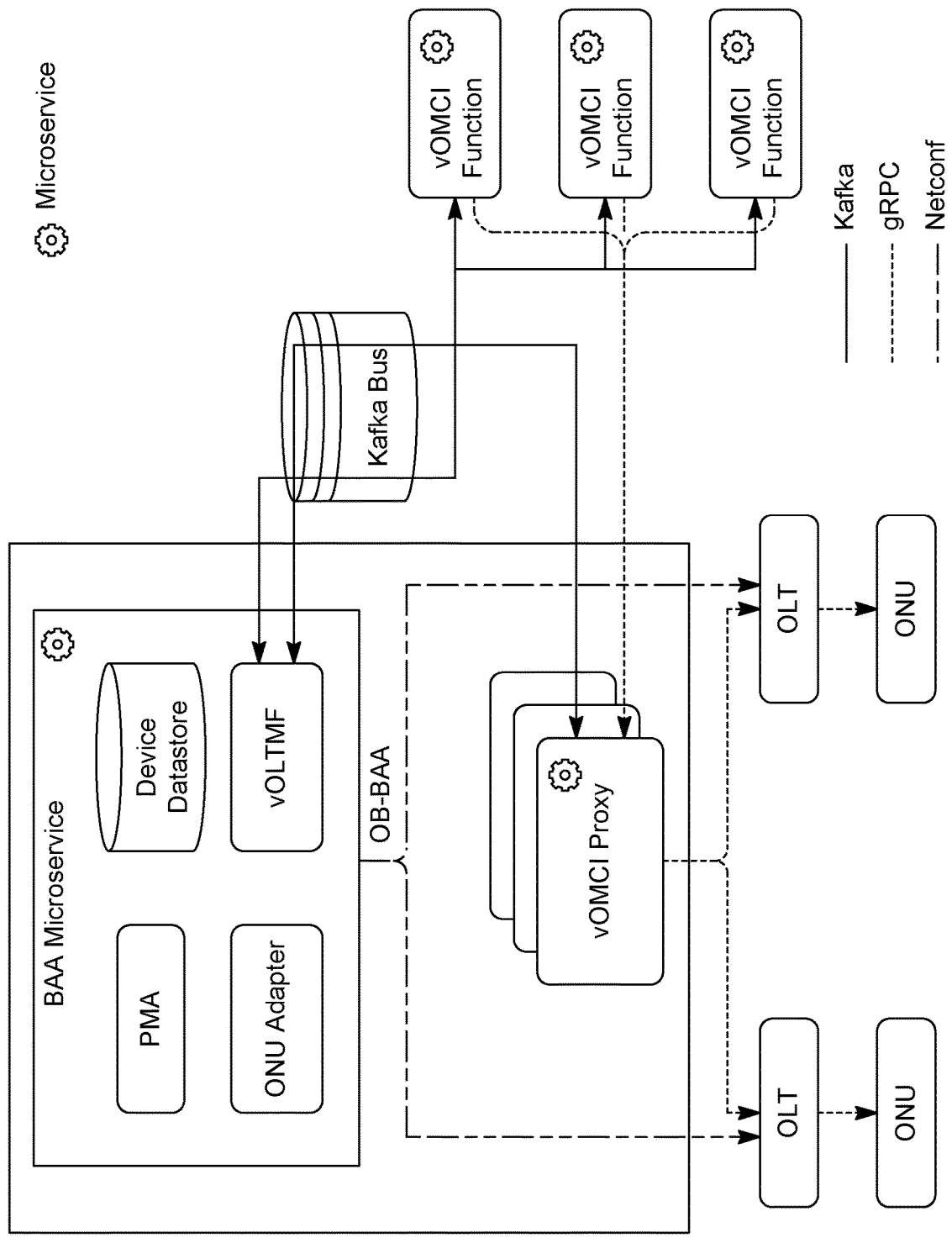
FIG. 4 illustrates a vOLT Management Function to manage ONTs though vOMCI messages in a passive optical network.

Referring to FIG. 4, a high-level design of the vOLT Management Function (vOLTMF) that may be used to manage ONTs through the vOMCI messages is illustrated. There is communication between the vOLTMF, vOMCI Proxy, and vOMCI function based upon creating and deleting ONTs, receiving ont-state-change notifications, and sending requests to ONTs. The vOLTMF manages ONTs through a ONT adapter that may be deployed as broadband access abstraction, the association of which is based on the model, type, vendor, and version mentioned while creating the ONT. The ONT adapter may use a library of the YANG modules for ONTs that the vOLTMF refers to for handling ONT requests, responses, and notifications from external management systems.

The vOLTMF performs actions upon receiving notifications and requests either from an OLT device or other components within the broadband access abstraction core. For example, the onu-state-change notification that is sent by the OLT device on its Northbound Interface (NBI) that is received by broadband access abstraction core. The broadband access abstraction core propagates the notification towards vOLTMF and broadband access abstraction NBI so that it can be handled by the Access SDN M&C.

Upon reception of the notification, the vOLTMF processes the notification, checks if a preconfigured ONU device exists and authenticates the ONU, the vOLTMF transforms the notification to Google Protobufs (GPB) format and propagates the set-onu-communication Action towards the vOMCI function and vOMCI-proxy via the Kafka bus.

All the YANG requests are sent towards the vOMCI function and vOMCI Proxy via the Kafka bus in GPB format. Once the vOMCI function/Proxy processes the requests, the vOMCI function sends the notification/request response in GPB format back to the vOLTMF via the Kafka bus and the response is received through the KafkaNotificationCallback #onNotification( ).

Upon receiving the response, the vOLTMF is responsible for processing the response and performs actions accordingly.

There could be multiple interactions between the vOLTMF and the vOMCI function including parallel configuration requests/commands for either the same or different ONUs. These interactions are parallel and asynchronous such that the requests are not idle/blocked while waiting for responses because the vOLTMF has separate task queues and threadpools to handle the request/response interactions. The following shows the list of vOLTMF threadpools that spawned as new Runnable tasks, namely, processNotificationRequestPool, kafkaCommunicationPool, kafkaPollingPool, processNotificationResponsePool, and processRequestResponsePool. processNotificationRequestPool is used for processing the mediated device event listener callbacks and device notification requests. kafkaCommunicationPool is used to process individual GET/COPY-CONFIG/EDIT-CONFIG requests inside a MediatedDeviceNetconfSession spawned by preocessRequestResponsePool. kafkaPollingPool is used to tart up the KafkaConsumer implementation and polling for responses from vOMCI-function/vOMCI Proxy. processRequestResponsePool is used for processing notification responses from the vOMCI-function/vOMCI Proxy. The processRequestResponsePool is used for processing GET/COPY-CONFIG/EDIT-CONFIG requests and responses from the vOMCI-function/vOMCI Proxy. In general, the process may be considered a type of protocol adapter to one that operates on an ONT that also works with an OLT in a PON environment. The OMCI messaging is based upon each message that is 53 bytes in length with a data payload of 31 bytes.

The OLT may provide OMCI messaging to multiple ONTs in a parallel fashion. A preferred manner of providing parallel OMCI messaging is to use a multi-threaded execution module using a pool of available threads. The OLT may include a scheduler which manages the instantiation of the threads and the usage of the instantiated threads.

In a typical environment the OLT is in communication with hundreds, if not thousands, of ONTs. However, the OLT has limited computational resources, so it is desirable that there are only a limited number of threads being used at any particular time in order to ensure the OLT has sufficient computational resources to provide data connectivity to its associated subscribers. The limited number of threads may be dynamically managed, as desired. The threads that are available to the OLT may be from a threadpool. A traditional threadpool makes use of any available threads for the next request that is made, so that it may most efficiently complete the tasks that are requested.

However, for an ONT that receives OMCI messages, many such messages or operations performed as a result are temporally sensitive, meaning that an operation associated with a first OMCI message (or set of messages) needs to be completed before an operation associated with a second OMCI message (or set of messages) is started. Otherwise, operations associated with the second OMCI message (or set of messages) may be executed by the ONT prior to the first OMCI message (or set of messages). Accordingly, a thread from a threadpool is defined with a specific assignment for a particular ONT.

Figure 5:
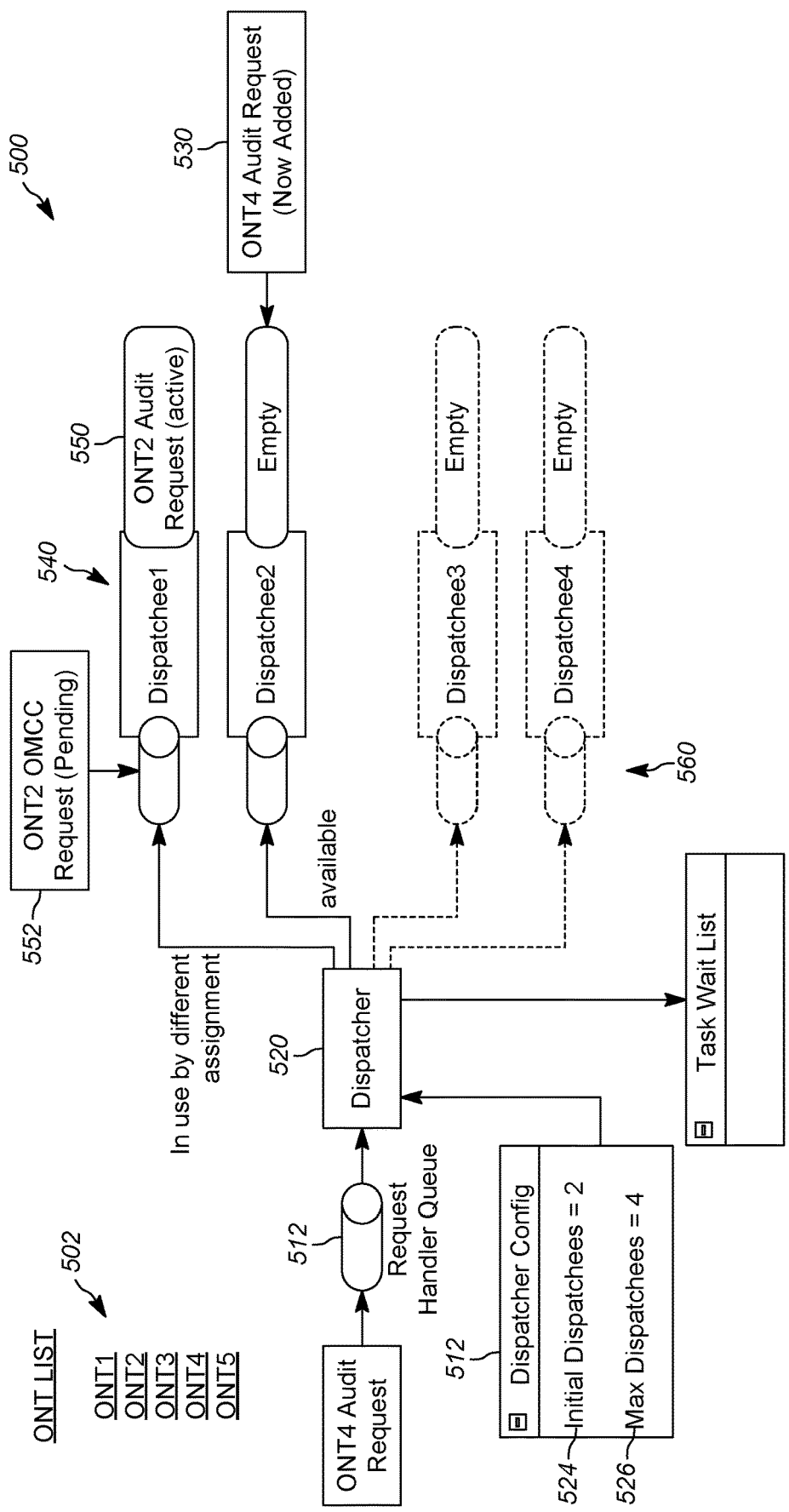
FIG. 5 illustrates a dispatcher system with pending requests and added request to existing threads.

Referring to FIG. 5, an exemplary thread dispatching system 500 is shown that includes 5 ONTs 502 accessible through the optical distribution network, referred to as ONT1, ONT2, ONT3, ONT4, and ONT5. Any number of OLTs may be included, as desired. The server and/or the OLT forms an optical network unit management and control interface ("OMCI") message that is provided over the ONT management and control channel ("OMCC") to the respective ONT. The thread dispatching system 500 receives, for example, an ONT4 Audit Request 510. The ONT4 Audit Request 510 is placed in a request handler queue 512 for processing. A dispatcher 520 receives the next request from the request handler queue 512. The dispatcher 520 includes a dispatcher configuration 522, that sets an initial number of threads that are created 524 each of which takes computational resources to create, and the maximum number 526 of threads that may be simultaneously maintained. The dispatcher 520 determines if there are any currently pending assignments for the ONT4. FIG. 5 illustrates that assignments are pending and/or active for ONT2. When there are no currently pending assignments for ONT4 and there are available threads that are not currently being used, the dispatcher 520 may assign a thread for the ONT4 Audit Request 530 to a dispatchee 540 and dispatch the thread request as an OMCI message to the ONT4.

The dispatcher 520 may receive a request for an ONT that has an active request, such as an additional request for ONT2 while ONT2 has a currently active request 550. Rather than assigning the additional request for ONT2 to an available dispatchee 540, which could result in an out of order operation by the ONT2, the additional request for ONT2 552 is placed in a respective dispatchee queue 560 to be dispatched after the currently active request 550 is completed. Each of the dispatchee queues 560 are preferably first-in-first out queues.

When the dispatcher 520 has drained its task queue for any particular dispatchee 540 so that there are none currently assigned for the particular dispatchee 540, nor pending requests for the particular dispatchee 540, the dispatchee 540 may signal the dispatcher 520 that the particular dispatchee 540 has completed all currently assigned and pending requests, and therefore available for additional assignments for the same or another ONT.

The thread dispatching system 500 initially creates an initial set of threads, based upon the initial dispatchee configuration 524, each of which requires computational resources to create and computational resources to maintain. The thread dispatching system 500 may create additional threads when, all the currently created threads have active assignments, and the number of created threads are less than or equal to the maximum number of threads permitted, based upon the max dispatches 526. In this manner, additional threads are created in a controlled manner that limits the computational burden placed on the server and/or ONT at any particular point in time and also avoids creating a large set of threads that are not otherwise necessary for the system because few, if any, threads are simultaneously used.

Figure 6:
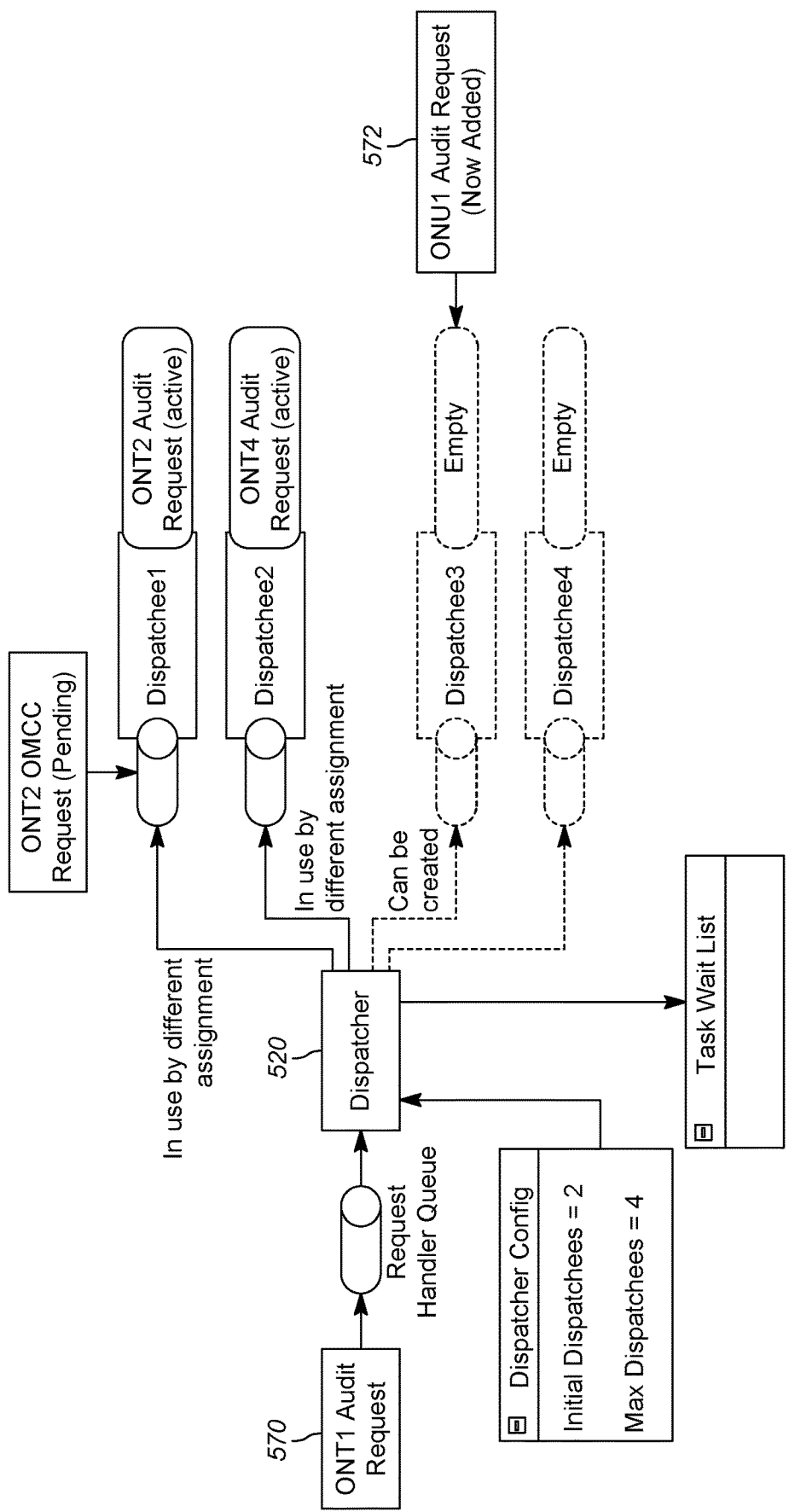
FIG. 6 illustrates the dispatcher system with new requests and a new thread added.

Referring to FIG. 6, when the dispatcher 520 receives an ONT1 active request 570, the dispatcher 520 determines that there are no active requests for ONT1, that there are no available threads that have been previously created, that there are fewer threads than less than the maximum number of dispatches permitted, and therefore creates another thread to which the ONT1 audit request 570 is added to 572. In this manner, the number of active threads is increased to accommodate the additional thread and the OMCC message is provided to the ONT.

Figure 7:
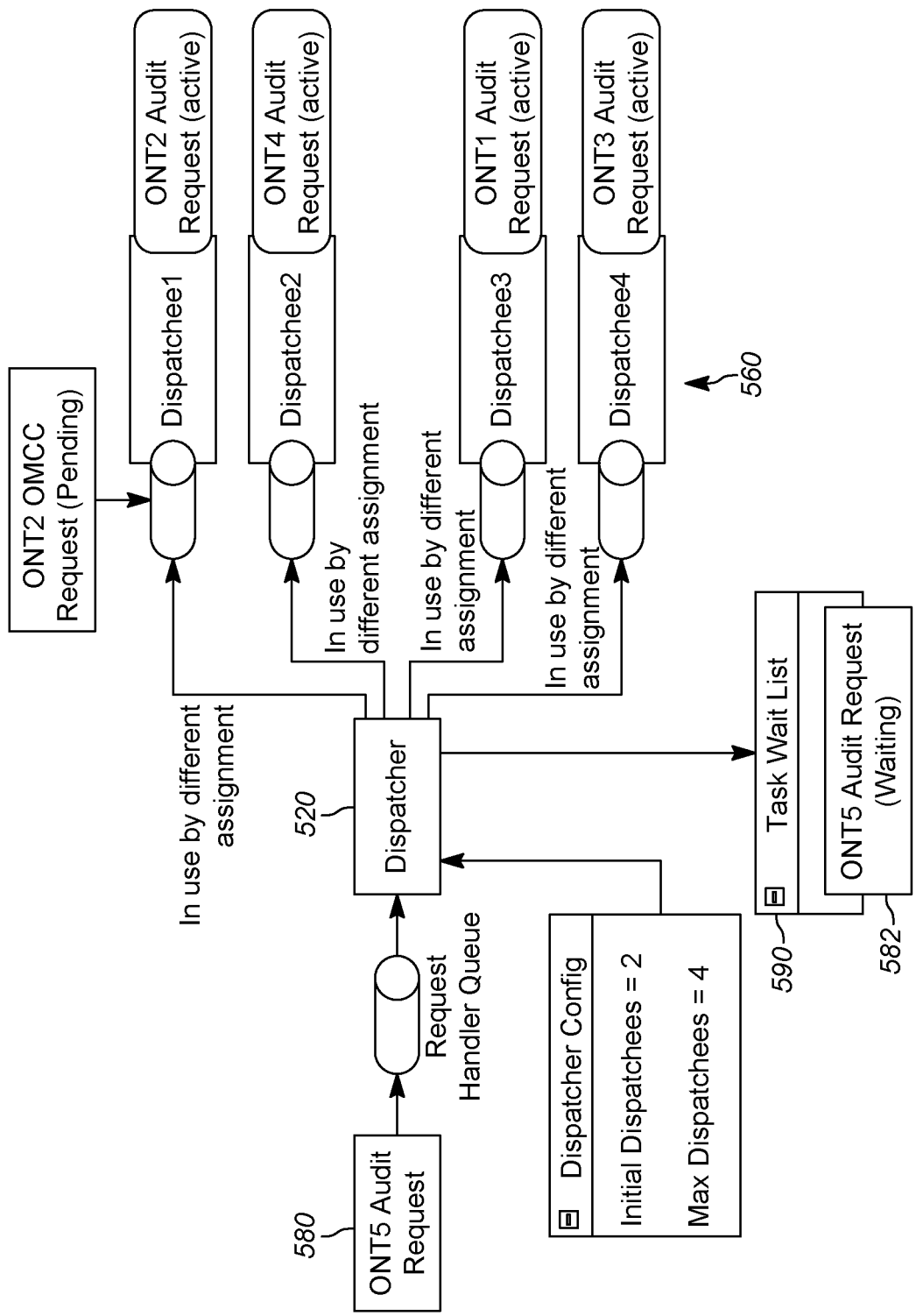
FIG. 7 illustrates the dispatcher system with a new request, no available threads, and a task wait list.

Referring to FIG. 7, when the dispatcher 520 receives an ONT5 audit request 580, the dispatcher 520 determines whether there are any active requests for ONT5, whether there are any available threads that have been previously created, whether there are fewer threads than less than the maximum number of dispatches permitted, and in such a case of no available threads adds the ONT5 audit request 582 to a task wait list 590. Other requests may be added to the task wait list 590, preferably processed in a first in first out manner. The ONT5 audit request 582 in the task wait list 590 is removed from the task wait list 590 when the dispatcher 520 determines that there is an available dispatchee 560 and in which case it is assigned to that dispatchee 560 and an OMCI message is provided to the respective ONT.

If desired, the thread dispatching system 500 may expand the maximum number of threads. Also, if desired, the thread dispatching system 500 may contract the maximum number of threads. The contraction of the thread count is preferably performed as a particular thread is no longer actively being used.

If desired, the thread dispatching system 500 may expand the minimum number of threads. Also, if desired, the thread dispatching system 500 may contract the minimum number of threads.

Often, an event occurs to the ONTs of the PON network where a substantial number of the ONTs need control and management in the form of OMCI messages as a result of a service outage. In such a case, it is desirable to prioritize OMCI messages based upon the service level agreement of the subscribers. For example, those with a high service level agreement may be provided with OMCI messages prior to those with a medium and low service level agreement. For example, those with a medium service level agreement may be provided with OMCI messages prior to those with a low service level agreement. For example, those with a low service level agreement may be provided with OMCI messages after all others have been provided with OMCI messages. Each of the requests may be maintained in the task wait list 590, and each request from task wait list 590 may be removed based upon the service level agreement prioritization. This provides an organized manner of prioritizing the OMCI messaging.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An optical line terminal comprising:
   (a) said optical line terminal includes a north bound interface that receives and sends data from and to a server, respectively;
   (b) said optical line terminal includes a port that receives and sends optical data from and to a plurality of optical network terminals, respectively, through an optical fiber;
   (c) said optical line terminal including a thread dispatching system that manages a plurality of threads that provides a first optical network terminal management and control interface message to a first one of said plurality of optical network terminals, a second optical network terminal management and control interface message to a second one of said plurality of optical network terminals, and a third optical network terminal management and control interface message to said first one of said plurality of optical network terminals;
   (d) wherein said thread dispatching system has an active said first optical network terminal management and control interface message on a first thread, has an active said second optical network terminal management and control interface message on a second thread, has a third thread that has no active optical network terminal management and control interface message, and queuing said third optical network terminal management and control interface message on said first thread to be dispatched after completion of said first optical network terminal management and control interface message on said first thread;
   (e) said thread dispatching system simultaneously queuing a plurality of messages for a plurality of different optical network terminals, said thread dispatching system changing the order of dispatching one of said plurality of messages to a respective optical network terminal based upon a service level agreement with a respective subscriber associated with said respective optical network terminal.

2. The optical line terminal of claim 1 further comprising said thread dispatching system that provides a fourth optical network terminal management and control interface message to a third one of said plurality of optical network terminals on said third thread.

3. The optical line terminal of claim 2 further comprising said thread dispatching system creating a fourth thread when said first thread, said second thread, and said third thread are active and said thread dispatching system receives another request for an optical network terminal that is not an optical network terminal associated with said first thread, said second thread, and said third thread.

4. The optical line terminal of claim 3 further comprising said thread dispatching system receives a further optical network terminal management and control interface message for said first optical network terminal and queuing said further optical network terminal management and control interface message on said first thread to be dispatched after completion of said first optical network terminal management and control interface message on said first thread and said third optical network terminal management and control interface message on said first thread.

5. The optical line terminal of claim 4 further comprising said thread dispatching system queueing additional optical network terminal management and control interface messages not associated with any optical network terminals that have active threads in a queue until a thread is available to provide one of said additional optical network terminal management and control interface messages to a respective optical network terminal.

6. The optical line terminal of claim 5 further comprising said thread dispatching system providing said additional optical network terminal management and control interface messages to a respective optical network terminal based upon a service level agreement with respective subscribers associated with said additional optical network terminal management and control interface messages.

7. The optical line terminal of claim 6, wherein said optical line terminal is a remote optical line terminal.

8. The optical line terminal of claim 5, wherein said optical line terminal is a remote optical line terminal.

9. The optical line terminal of claim 4, wherein said optical line terminal is a remote optical line terminal.

10. The optical line terminal of claim 3, wherein said optical line terminal is a remote optical line terminal.

11. The optical line terminal of claim 2, wherein said optical line terminal is a remote optical line terminal.

12. The optical line terminal of claim 1 further comprising said thread dispatching system including an initial number of threads defined by an initial configuration value.

13. The optical line terminal of claim 12, wherein said optical line terminal is a remote optical line terminal.

14. The optical line terminal of claim 1 further comprising said thread dispatching system including a maximum number of threads defined by a maximum configuration value.

15. The optical line terminal of claim 14, wherein said optical line terminal is a remote optical line terminal.

16. The optical line terminal of claim 1 further comprising said thread dispatching system queueing additional optical network terminal management and control interface messages not associated with any optical network terminals that have active threads in a queue until a thread is available to provide one of said additional optical network terminal management and control interface messages to a respective optical network terminal.

17. The optical line terminal of claim 16, wherein said optical line terminal is a remote optical line terminal.

18. The optical line terminal of claim 1, wherein said optical line terminal is a remote optical line terminal.

* * * * *